United States Patent [19]
Himes

[11] 3,985,702
[45] Oct. 12, 1976

[54] DRY BLENDING AND MOLDING PROCESS
[75] Inventor: Glenn Roy Himes, Torrance, Calif.
[73] Assignee: Shell Oil Company, Houston, Tex.
[22] Filed: May 27, 1975
[21] Appl. No.: 581,197

[52] U.S. Cl. .................. 260/33.6 AQ; 260/34.2; 260/876 B
[51] Int. Cl.² ........................................ C08K 5/01
[58] Field of Search ........ 260/33.6 AQ, 34.2, 876 B

[56] References Cited
UNITED STATES PATENTS
3,589,036  6/1971  Hendricks et al. ................. 36/32 R
3,641,205  2/1972  LaFlair et al. .................... 260/876 B
3,877,101  5/1975  Lewis ............................. 12/142 RS OTHER PUBLICATIONS
Haws et al., Rubber World, 167, 27–30, 32, and 48 (Jan. 1973).

Primary Examiner—Lewis T. Jacobs
Assistant Examiner—H. H. Fletcher

[57] ABSTRACT

A process is provided for making a molded article having both a thermoplastic polymer component and a thermoplastic rubber component which comprises dry blending small particles of thermoplastic rubber with particles of thermoplastic polymer having an average particle size diameter less than about 1.0 mm; and a liquid plasticizer; and forming the dry blended mixture into a molded article.

9 Claims, No Drawings

DRY BLENDING AND MOLDING PROCESS

BACKGROUND OF THE INVENTION

This invention relates to the manufacture of molded articles. The use of elastomeric materials such as synthetic rubber in the manufacture of molded articles such as shoe components has long been known. Such materials have high coefficients of friction and ground-gripping properties and are very flexible at low or ambient temperatures. With most types of rubber, however, it is necessary to compound them with vulcanizing agents and subject the compounds to mastication followed by molding operations in the presence of sufficient heat and for a time sufficient to effect vulcanization. Of course, for some end uses, other polymers such as polyvinylchoride may be employed. The latter type of polymer, however, exhibits certain undesirable characteristics for end uses such as footwear due for example, to high wet slip and cold stiffness.

In recent years a number of block polymers have been developed which are elastomeric and which exhibit the stress-strain properties of vulcanized rubber without having been chemically vulcanized. This special class of polymers is referred to as thermoplastic elastomers, since they not only exhibit typical elastomeric properties but also may be processed in equipment normally employed for the rocessing of ordinary thermoplastic polymers such as polystyrene processing polyolefins.

The most highly developed types of block copolymers include linear or branched species having thermoplastic polymer blocks interspersed with elastomeric polymer blocks. Typical examples of these include block copolymers of monoalkenyl arenes with conjugated dienes as well as certain hydrogenated derivatives thereof. Other suitable thermoplastic elastomers comprise olefinic block polymers having blocks of ethylene or propylene combined with olefin copolymer blocks. Typical commercial materials include those sold under the trade name "KRATON" by Shell Chemical Company and "KRATON G"$^{tm}$, sold by the same company. The latter block copolymers comprise polymer blocks of monoalkenyl arenes such as styrene combined with elastomeric polymer blocks of an olefin copolymer or a hydrogenated polymer block of a conjugated diene.

Suitable methods for the preparation of block copolymer thermoplastic elastomers may be found in the following patents:

U.S. Pat. No. 3,265,765
U.S. Pat. No. 3,333,024
U.S. Pat. No. Re 27,145
U.S. Pat. No. 3,594,452
U.S. Pat. No. 3,726,944
U.S. Pat. No. 3,244,664

Because of their desirable combination of physical properties, these thermoplastic elastomers have found ready acceptance in mumerous molding processes and particularly in the shoe industry as well as pharmaceutical, automotive and sporting equipment. In the past, the thermoplastic elastomers have generally been compounded with other components such as fillers, extenders, plasticizers and the like in a kneading-type of mixer such as a Banbury Mixer. Such mixers entail high power requirements and the compounded mixtures must thereafter be further treated to form nibs or pellets, which are then utilized in well-known molding machines such as injection molders and the like.

Another type of compounding process which is beginning to receive attention (see U.S. Pat. No. 3,877,101) is referred to as dryblending. By this is generally meant a low shear mixing process which blends the compounding ingredients together without the formation of a coherent mass and which results in a relatively free-flowing mixture of ingredients in particulate form--which forms a suitable feed for commercially available molding equipment.

Certain difficulties have been encountered in adapting dry blending to thermoplastic elastomer compounds wherein the compounds include additionally not only a plasticizer but also thermoplastic polymers such as polystyrene, polyethylene or polypropylene, and other known thermoplastic polymers. In many instances it has been found that dry blending has not accomplished the desired degree of dispersion of the thermoplastic polymer in the molded article. This may result in certain unsatisfactory physical properties in the end product.

In the present specification and claims, the term "thermoplastic polymer" is distinguished from the term "thermoplastic elastomer" or "thermoplastic rubber" in that the thermoplastic polymers are defined as non-elastomeric polymers, which have the generally well-known characteristics of ordinary thermoplastics such as those referred to hereinbefore, namely, polystyrene, polyethylene or polypropylene.

It is an object of this invention to provide an improved process for manufacturing molded articles utilizing combinations of thermoplastic rubbers, plasticizers and thermoplastic polymers. It is a further object of this invention to provide a process for utilizing a dry blending process for compounding these ingredients in which the subsequently molded article exhibits improved dispersion of the compound ingredients. Other objects will become apparent during the following detailed description of the invention.

DESCRIPTION OF THE INVENTION

Now, in accordance with the present invention, a process for making a molded article from a thermoplastic rubber, a thermoplastic polymer, and a plasticizer comprises the following essential steps:

a. dry blending small particles of thermoplastic rubber with particles of thermoplastic polymer having an average particle size diameter less than about 1.0 mm and a liquid plasticizer; and
b. forming the mixture into a molded article.

In accordance with the present invention it was found that the average particle size diameter of the thermoplastic polymer was more critical in the dry blending process than was the average particle size of the thermoplastic elastomer. As will be seen in the working examples which follow, optimum results were obtained when the thermoplastic polymer e.g., polystyrene, enthylene vinyl acetate copolymers, polyethylene or polypropylene, and mixtures thereof, was formed in particles having average diameters between 0.15 and 0.75 mm. This is evidenced by the inprovement in physical properties of injection molded shoes made from a number of dry blended compounds wherein a variable between the several samples was the average particle size of the polystyrene. The degree of ultimate dispersal of blend components is equally important in molded articles intended for other purposes.

In forming small particles of either the elastomer or polymer, it is important to effect the particle-size reductions in such a manner as to minimize the possibility of thermal and mechanical degradation. Preferably this is done by granulating the two types of materials in high shear, low impact, rotary cutting granulators such as those sold by Wedco, Inc., Cumberland Engineering Co., Entoleter, Inc., Amacoil Machinery, Inc., and Metalmecconica Plast. S.A. of Italy, and others which are known in the art. Preferably, the thermoplastic elastomer is reduced to a particle below 3/16 of an inch, preferably to pass a standard 10–30 mesh screen. These particles, of course, may be inherently formed in the polymerization process in the correct particle size. Another means of forming the small particles comprises addition of a non-solvent for a rubber or polymer solution in such a way as to form a powdered precipitate. For economic reasons it is preferred to utilize the largest particle size which will give the desired degree of dispersion in the eventually molded article. The optimum particle size may vary with the specific molding apparatus and molding conditions used. However, as stated hereinabove, the particle size of the thermoplastic polymer has been found to be unexpectedly critical in achieving the desired degree of dispersion, whereas substantially more leeway is possible with the particle sizes of the thermoplastic elastomers. Thermoplastic elastomers are often porous bodies due to their method of recovery from their polymerization mixtures in the form of a crumb. This porous structure is retained in the ultimate particles formed in a granulating operation.

The essential step of the process of the present invention is the dry blending (also known as dry mixing) of the suitable thermoplastic elastomeric particles, thermoplastic polymer particles, and plasticizer, together with other special compounding ingredients such as fillers, resins, colorants, antioxidants and the like. Dry blending has been employed previously for compounding polyvinyl chloride compounds, and recently has been developed to a certain extent in compounding thermoplastic elastomers as shown by U.S. Pat. No. 3,877,101.

The equipment for dry blending is essentially the same as that employed in the dry blending of polyvinyl chloride. While the equipment preferably combines mixtures of the high intensity types such as the German Henschel or Pappenmeier types, better known as the Prodex or Welex machines, respectively, in the United States. Other suitable apparatus is also known in the art. Less intense types of dry blending equipment have been found unexpectedly suitable, such as drum tumblers, ribbon blenders or rotary mixers such as cement mixers.

Generally, the ingredients may be mixed with plasticizers such as hydrocarbon (i.e. petroleum) extending oils, by several stages, or in a single stage. Due to their affinity, it is preferred that at least a portion of the plasticizing oil be added to the thermoplastic elastomer prior to incorporation of the balance of the compounding ingredients. In fact, it is possible to blend at least a portion of the oil or other plasticizer with the thermoplastic elastomer before forming the small particles of the latter. Alternatively, the thermoplastic elastomer may be placed in the mixer together with the plasticizer and mixing commenced. In a relatively short space of time, it is found that the plasticizer is absorbed on the particles of the compound components and the dry blending process eventually results in a relatively free flowing particulate mixture which is suitable for use in subsequent molding opeartions.

A wide variety of compounding agents or additives suitable for thermoplastic elastomer compounds are well known in the art. Fillers and reinforcing agents such as clays, carbon blacks, silicas, whitings and others often improve resistance to abrasion and crack growth and increase hardness. Oils generally act as plasticizers, with naphthenic and paraffinic types being preferred to aromatic oils. Other known plasticizers can also be used. Fire retardants may be utilized. Other resins may advantageously be combined with the thermoplastic elastomer to adjust the properties of the final product. Polystyrene, for example, is useful to adjust properties and is quite compatible with butadiene-styrene block polymers. The addition of polystyrene generally increases hardness, tear strength, abrasion resistance and flex life. Other resins useful alone in combination with polystyrene are known in the art, and include polyindine, coumarone-indene, pentaerythritol esters of hydrogenated resin, etc. Other suitable ingredients, such as antioxidents, stabilizers, etc., are also known in the art.

The granulating and dry blending of thermoplastic elastomers and similar materials is shown in the patent and open literature, such as in the following patents:

|  | Filing Date |
|---|---|
| U.S. 3,589,036 | 1-06-65 |
| U.S. 3,769,417 | 5-12-71 |
| U.S. 3,793,283 | 3-16-72 |
| U.S. 3,558,576 | 2-06-68 |
| U.S. 3,567,670 | 12-29-67 |

A number of Technical Bulletins published by Shell International Chemical Company Ltd., London, also show a number of aspects of granulating and dry blending thermoplastic elastomers, thermoplastic polymers and plasticizers. It is evident from these that there is no unexpected difficulty in granulating block copolymers or their compounds and that dry blending is recommended to avoid Banbury or extrusion blending. Some of these Bulletins are listed herewith:

|  | Publication Date |
|---|---|
| RBX/72/19 | Nov., 1972 |
| RBX/73/3 | Feb., 1973 |
| RBX/72/24 | Sept., 1972 |
| RBX/71/10 | Mar., 1971 |
| RBX/72/4 | Jan., 1972 |
| RBS/72/5 | Mar., 1972 |
| RBX/71/27 | Sept., 1971 |
| RBX/69/44 | 1969 |

While elevated temperatures tend to aid the absorption of the oils into the elastomer and thus speed the dry blending step, care should be taken that the temperature not be allowed to rise too high. Normally the dry blend is in condition for use long before temperatures would climb to degrading levels, but in any event the temperature should not be allowed to exceed 170° F, more preferably should be maintained below to 150° F.

The final essential stage in the present process comprises forming the dry blended mixture into a molded article. The formation of footwear is especially contemplated, and injection molding of footwear is particularly recommended. However, the dry blended compounds may be treated by other molding opeartions, such as extrusion or calendering. The formation of slab soling, for instance, results in an extruded or calendered sheet from which footwear soles or heels may be stamped. Reference is made to U.S. Pat. No. 3,589,036 for sutiable variations in compounding and footwear formation. Suitable commercial footwear injection molding machines include those manufactured by Desma, Bata, and Gesta. It was found in accordance with the present invention, that the polystyrene dispersion and the crack resistance varied with the average particle size of the polystyrene in the footwear compound.

The following example presents details of a comparative study of polystyrene particle sizes and its effect upon molded articles. The following formulation was prepared in the dry blending process for these comparative tests:

TABLE I

| | Parts by weight |
|---|---|
| Oiled block polymer [1] | 155 |
| Mineral Oil | 53 |
| Crystal polystyrene | 60 |
| Calcium carbonate | 39 |
| Clay | 39 |
| Titanium dioxide | 7 |
| Antioxidant | 1 |

[1] Polystyrene-polybutadiene-polystyrene, block mol wts 22,000-48,000-22,000, the oiled polymer contained 55 parts by wt. of a paraffinic/naphthenic rubber-extending mineral oil per 100 parts by weight of the block copolymer.

The oiled block copolymer was granulated to an average particle diameter of 1.7 mm in a Wedco Granulator to pass a 12-mesh U.S. Standard Sieve. A series of polystyrene samples was granulated in the same type of apparatus from the original nib size (2.4 mm diameter) to the particle sizes listed in the Table II given below. The oiled block copolymer and the supplementary paraffinic/naphthenic-extending oil were then mixed in a cement mixer at about 115° F, after which the remaining dry ingredients were added and mixing continued for about 20 minutes to produce the relatively free flowing particulate dry blended compounds. Each of these compounds was then utilized in a Bata Monopak injection molding shoe machine wherein canvastop shoes were made. The following Table II illustrates the effect of polystyrene particle size upon the quality of the shoes so obtained.

According to the data obtained, polystyrene dispersion was poor when the particle size was greater than about 1 mm. Moreover, this is reflected in the relatively poor flex life of the shoes made from the coarse samples of polystyrene. In addition, sprue breakage occured with shoes containing the coarser polystyrene.

TABLE II

| | Dry Blends | | | | | |
|---|---|---|---|---|---|---|
| Predominant Particle Size of Polystyrene Used (minimum dimension, mm. | 2.4 (nibs) | 1.3 | 0.6 | 0.4 | 0.3 | 0.17 |
| Thin Sheet Dispersion of Polystyrene[2] | Very Poor | Poor | Fair | Accept. | Accept. | Accept. |
| Hardness, Rex | 58 | 63 | 56 | 59 | 60 | 60 |
| Stiffness, manually rated, 1 to 6 scale (6=stiffest) | 5 | 5 | 5 | 3 | 3 | 3 |
| Ross Flex Crack Resistance at 75°F (0.257 inch thickness) Kilocycles to rating[3] of | | | | | | |
| 9 | 9 | 40 | 54 | 90 | 90 | 84 | 148 |
| 6 | 6 | 72 | 99 | 170 | 171 | 141 | 217 |
| 2 | 2 | 149 | 218 | 200 | 245 | 195 | 366 |

[1] Molded on the Bata Monopak machine.
[2] Acceptable: no visible undispersed polystyrene; Fair: few small fragments or streaks. Poor: many small particles; Very Poor; many large particles of original nib size.
[3] Based on 10 to 0 scale in which 10 denotes no cracking and 0 denotes complete rupture. ASTM Test D1052-55. Modified by omitting aging (paragraph 3.2).

I claim as my invention:

1. The process for making a molded article having a thermoplastic elastomer component and a thermoplastic polymer component selected from the group consisting of polystyrene, ethylene vinyl acetate copolymer, polyethylene, polypropylene and mixtures thereof, comprising:
   a. forming small particles of thermoplastic rubber;
   b. forming particles of thermoplastic polymer having an average particle size diameter less than about 1.0 mm;
   c. dry blending the particles from steps a) and b) together with a liquid plasticizer for at least the rubber or the polymer to produce a free-flowing particulate mixture;
   d. and forming the mixture into a molded article.

2. A process according to claim 1 wherein the thermoplastic elastomer is a block copolymer of a conjugated diene and a monalkenyl arene.

3. A process according to claim 1 wherein the thermoplastic polymer is polystyrene.

4. A process according to claim 1 wherein the plasticizer is a hydrocarbon oil.

5. A process according to claim 1 wherein the thermoplastic polymer particles formed in step (b) have an average particle size between about 0.15 and 0.75 mm.

6. A process according to claim 1 for making molded footwear component comprising:
   a. forming small particles of a thermoplastic elastomeric block copolymer of styrene and butadiene;
   b. forming particles of polystyrene having an average particle size diameter between about 0.15 and 0.75 mm;
   c. dry blending the block copolymer and polystyrene with a plasticizing proportion of a mineral oil; and
   d. molding the mixture so formed.

7. The process for making a molded article having a blended thermoplastic elastomer component and a thermoplastic polymer component which comprises
   a. dry blending particles of a thermoplastic polymer, selected from the group consisting of polystyrene, ethylene vinyl acetate copolymer, polyethylene, polypropylene and mixtures thereof, the particles being less than about 1 mm average diameter, a plasticizer and small particles of a thermoplastic elastomer to form a free flowing particulate mixture; and b. forming the mixture into a molded article.

8. A process according to claim 7 wherein the thermoplastic polymer is polystyrene, the average particle diameter of which is between about 0.15 and 0.75 mm.

9. In a process for molding an article from a mixture of a thermoplastic polymer and a thermoplastic elastomer, wherein a plasticizer and small particles of both said rubber and polymer are dry blended to form a free flowing particulate mixture and forming the mixture into a molded article, the improvement comprising using particles of the thermoplastic polymer having an average particle size diameter less than about 1 mm.

* * * * *